United States Patent
Fujiki

(10) Patent No.: US 7,420,556 B2
(45) Date of Patent: Sep. 2, 2008

(54) INFORMATION PROCESSING METHOD AND INFORMATION PROCESSING APPARATUS

(75) Inventor: Masakazu Fujiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 11/187,980

(22) Filed: Jul. 25, 2005

(65) Prior Publication Data

US 2006/0017725 A1 Jan. 26, 2006

(30) Foreign Application Priority Data

Jul. 26, 2004 (JP) .............................. 2004-217772

(51) Int. Cl.
*G06T 25/00* (2006.01)
*G06T 15/20* (2006.01)
*G09G 5/00* (2006.01)

(52) U.S. Cl. .................. 345/427; 345/419; 345/629; 345/653; 345/664; 345/679

(58) Field of Classification Search ......... 345/419–680; 715/848–852
See application file for complete search history.

(56) References Cited

U.S. PATENT DOCUMENTS

| | | | | |
|---|---|---|---|---|
| 5,122,966 A | * | 6/1992 | Jansen et al. | 700/178 |
| 6,124,861 A | * | 9/2000 | Lebovitz et al. | 715/808 |
| 7,053,916 B2 | | 5/2006 | Kobayashi et al. | 345/633 |
| 2005/0131857 A1 | | 6/2005 | Fujiki et al. | 707/1 |
| 2005/0280661 A1 | | 12/2005 | Kobayashi et al. | 345/633 |
| 2006/0075058 A1 | | 4/2006 | Fujiki et al. | 709/213 |
| 2006/0089974 A1 | | 4/2006 | Kobayashi et al. | 709/213 |
| 2006/0167954 A1 | | 7/2006 | Fujiki et al. | 707/201 |

OTHER PUBLICATIONS

J. Wernecke, The Inventor Mentor: Programming Object-Oriented 3D Graphics with Open Inventor™, Release 2, pp. 236-245, Mar. 1994.

* cited by examiner

*Primary Examiner*—Kee M. Tung
*Assistant Examiner*—Hau H Nguyen
(74) *Attorney, Agent, or Firm*—Fitzpatrick, Cella, Harper & Scinto

(57) ABSTRACT

An information processing method and information processing apparatus facilitate selection of components which form a geometric model. Of a plurality of components which form a three-dimensional geometric mode, components which satisfy predetermined geometrical search criteria are searched for. The obtained components are set in a rendering mode different from that of other components. Therefore, even an occluded-component, which cannot be directly seen from outside a three-dimensional model, can be visually recognized and selected.

10 Claims, 11 Drawing Sheets

INFORMATION PROCESSING METHOD AND INFORMATION PROCESSING APPARATUS

FIELD OF THE INVENTION

The present invention relates to an information processing method and information processing apparatus that handle a three-dimensional geometric model and, more particularly, to an information processing method and information processing apparatus which allow easy selection of components that form a geometric model.

BACKGROUND OF THE INVENTION

In the field of computer graphics (CG), when some manipulations such as move, rotation, and the like are applied to a geometric model defined on a three-dimensional (3D) space, that geometric model must be selected while being identified from other geometric models.

As a method of selecting an arbitrary one of a plurality of geometric models defined on an identical space, "Open Inventor" as a graphics library of SGI comprises a function of detecting a shape that intersects a line on the 3D space from those which form a virtual space (see "The Inventor Mentor Programming Object-Oriented 3D Graphics with Open Inventor, Release 2" Additon-Wesley, ISBN: 0-201-62495-8).

However, one geometric model is formed of a plurality of components. Therefore, if it has a geometrical relationship like that a given component (to be referred to as an occluded-component hereinafter) is occluded by another opaque component (group) (to be referred to as an occluding-component hereinafter), the occluded-component cannot be visually recognized in a CG image rendered by externally observing that geometric model. Therefore, in this case, it is impossible to interactively select occluded-components while observing the CG image.

SUMMARY OF THE INVENTION

In consideration of the above situation, it is an object of the present invention to provide an information processing method and apparatus, which allow easy and intuitive selection of an occluded-component which is occluded by another component and is not seen in a geometric model formed of a plurality of components.

According to an aspect of the present invention, there is provided an information processing method comprising: a detection step of detecting a component, which satisfies predetermined criteria, of a plurality of components which form a three dimensional geometric model; a display setting step of setting a display mode of the component, which satisfies the criteria, of the plurality of components to be different from a display mode of components which do not satisfy the criteria; a three dimensional model rendering step of displaying the three dimensional geometric model on the basis of the display modes set for the plurality of components; and a selected state setting step of setting one component, which satisfies a predetermined condition, of the components, which do not satisfy the criteria, in a selected state.

According to another aspect of the present invention, there is provided an information processing method comprising: a detection step of detecting a component, which satisfies predetermined criteria, of a plurality of components which form a three dimensional geometric model; a display mode setting step of setting a display mode of the component, which satisfies the criteria, of the plurality of components to be different from a display mode of components which do not satisfy the criteria; and a three dimensional model displaying step of rendering the three dimensional geometric model on the basis of the display modes set for the plurality of components.

According to a further aspect of the present invention, there is provided an information processing method of applying a display process to a three dimensional shape model formed of a plurality of components, the method comprising: a setting step of setting a reference position and reference direction, and defining a line segment extending from the reference position in the reference direction; a search step of searching for intersections between the line segment and the plurality of components; a comparison step of comparing distances from the reference position to the obtained intersections with a reference distance which is set in advance; and a three dimensional model display step of displaying components, which have distances from the reference position to the intersections larger than the reference distance, and components, which have distances from the reference position to the intersections smaller than the reference distance, in different display modes.

According to yet a further aspect of the present invention, there is provided an information processing apparatus comprising: detection means for detecting a component, which satisfies predetermined criteria, of a plurality of components which form a three dimensional geometric model; display mode setting means for setting a display mode of the component, which satisfies the criteria, of the plurality of components to be different from a display mode of components which do not satisfy the criteria; three dimensional model displaying means for displaying the three dimensional geometric model on the basis of the display modes set for the plurality of components; and selected state setting means for setting one component, which satisfies a predetermined condition, of the components, which do not satisfy the criteria, in a selected state.

According to another aspect of the present invention, there is provided a program for making a computer execute an information processing method of the present invention.

According to an aspect of the present invention, there is provided a computer readable recording medium storing a program for making a computer execute an information processing method of the present invention.

With such arrangement, according to the present invention, in a geometric model formed of a plurality of components, an occluded-component which is occluded by another component and is not seen can be easily and intuitively selected.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

This embodiment will exemplify a case wherein the interior of a geometric model is visually recognized by rendering translucent a component that intersects a virtual line segment which is set on the 3D space, thus allowing selection of an occluded-component.

Figure 1A:
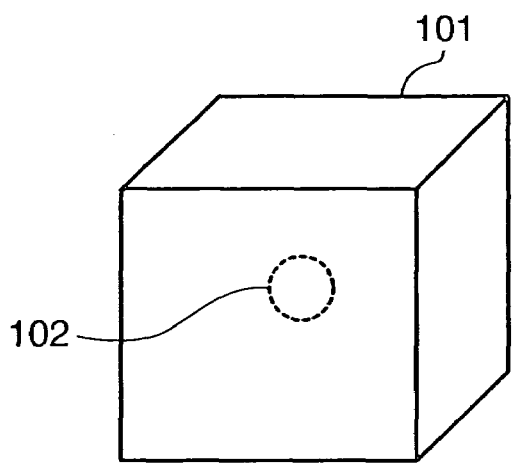
FIGS. 1A to 1C are views illustrating an occluded-component selection method according to the first embodiment of the present invention.
Figure 1B:
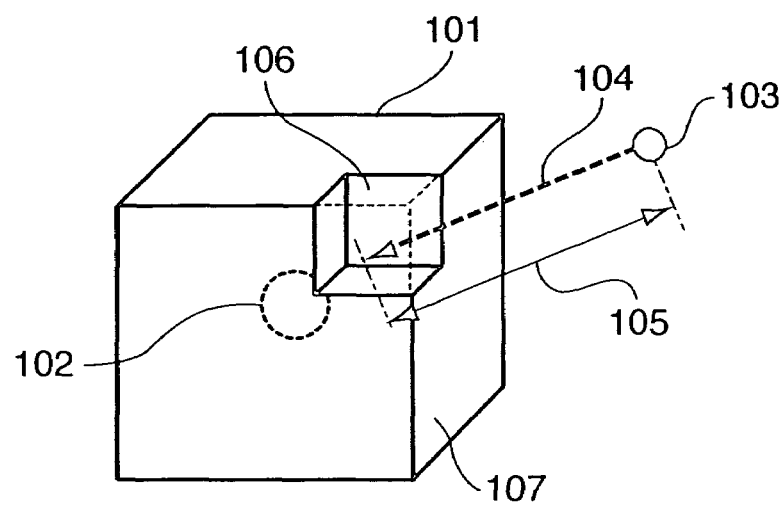
Figure 1C:
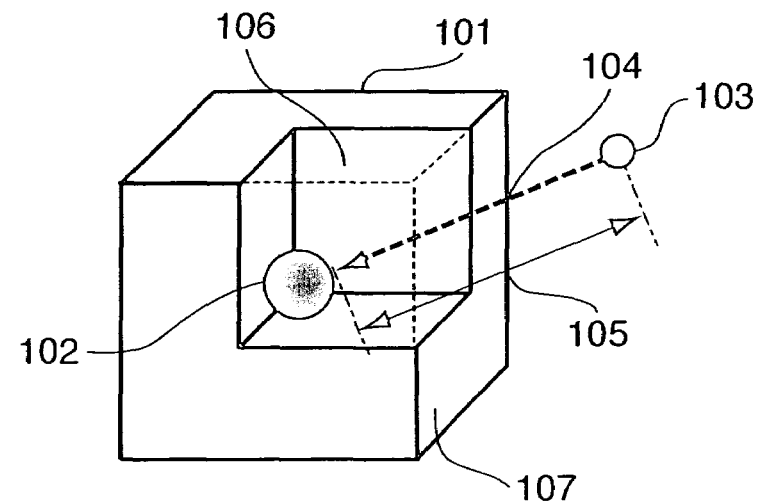

FIGS. 1A to 1C are views for explaining an occluded-component selection method according to this embodiment. FIGS. 1A to 1C show two-dimensional images which are obtained by projecting an identical geometric model onto a predetermined plane in different states.

FIG. 1A shows a state wherein a 3D geometric model 101 having a rectangular parallelepiped shape, and a spherical-shaped component (occluded-component) 102 are rendered from outside the 3D geometric model. In this state, the occluded-component 102 cannot be visually recognized since it is occluded by an opaque occluding-component 101.

In this embodiment, as shown in FIG. 1B or 1C, a reference position 103, reference direction 104, and reference distance 105 are set on a virtual 3D space which is set upon rendering a geometric model or on an arbitrary 3D space which allows coordinate transformation with that virtual 3D space. At this time, the following geometric search condition is specified. Under this condition, a line segment (corresponding to an arrow 104 in FIG. 1B or 1C) which is parallel to the reference direction 104 and has a length having the reference position 103 as an origin that is equal to the reference distance 105 is assumed, and a component that intersects this line segment is handled as a component which is not to be selected by the selection process. Note that the component which is not to be selected by the selection process will be referred to as a not-to-be-selected component hereinafter. The reference position is set to exist outside the 3D geometric model on the virtual 3D space.

Of the components that form the geometric model 101, those which are not not-to-be-selected components are called to-be-selected components. In FIGS. 1B and 1C, reference numeral 106 denotes a set of not-to-be-selected components; and 107, a set of to-be-selected components. In this embodiment, to-be-selected components are rendered opaque, and not-to-be-selected components are rendered translucent. As a result of such rendering, internal to-be-selected components can be visually recognized through not-to-be-selected components. However, in the state shown in FIG. 1B, the occluded-component 102 cannot be visually recognized since it is occluded by the occluding-component 101.

When the component 102 is to be selected, the reference position 103 is interactively set closer to the geometric model 101 or the reference direction and reference distance are changed while observing the projected image of the geometric model from the state of FIG. 1B, so that components around the component 102 become not-to-be-selected components. With this operation, the occluded-component 102 can be visually recognized and can be selected.

Figure 2:
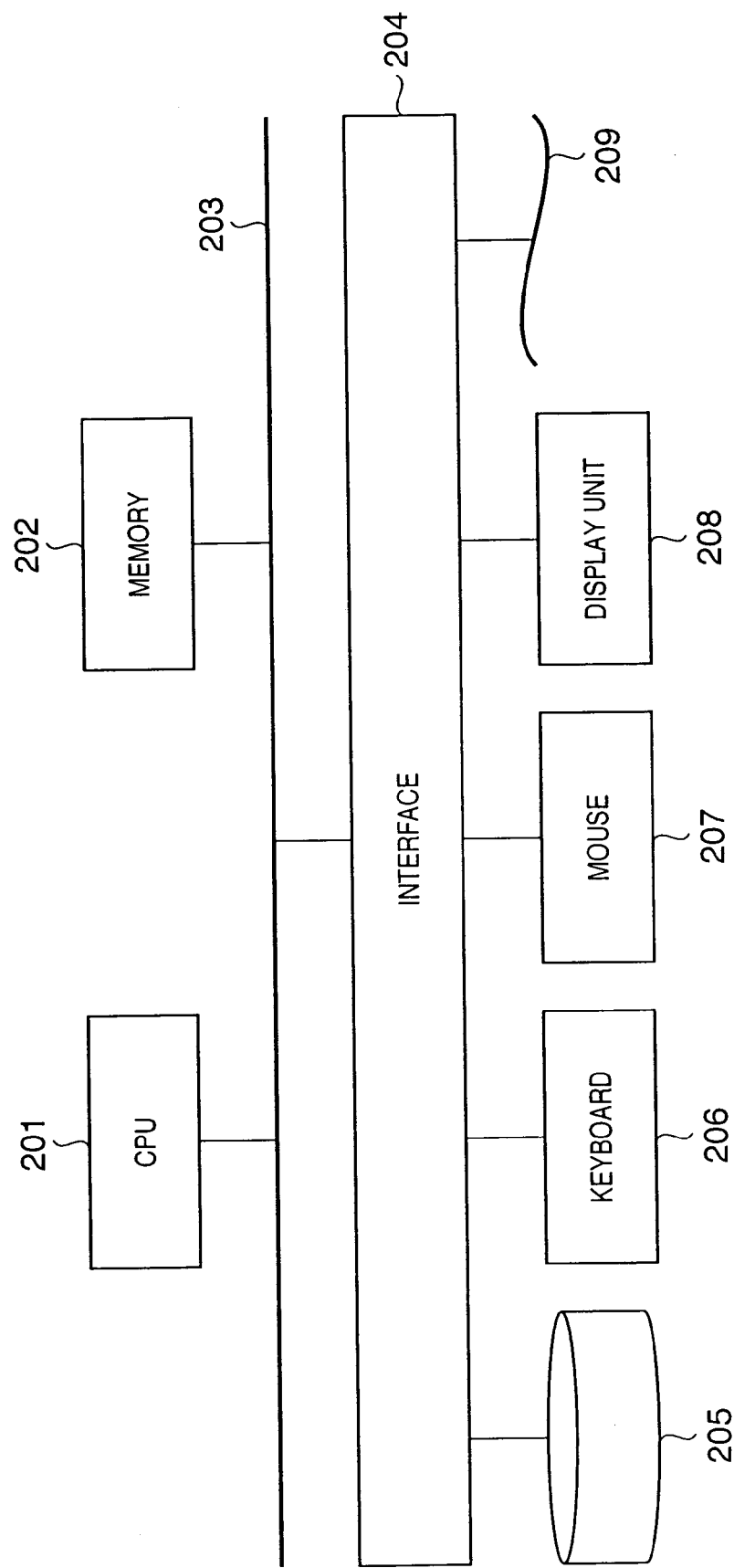
FIG. 2 is a block diagram showing an example of the arrangement of an information processing apparatus according to the first embodiment of the present invention.

FIG. 2 shows an example of the arrangement of an information processing apparatus that can implement such geometric model selection method. Referring to FIG. 2, a CPU 201 controls the operation of the overall information processing apparatus. A memory 202 stores programs and data used in the operation of the CPU 201. A bus 203 controls data transfer among modules which form the apparatus. An external storage device 205 stores programs and data to be loaded by the CPU 201. A keyboard 206 and mouse 207 form an input device used to give various instructions (a program launch instruction, various setting instructions, and the like) from the user to the information processing apparatus. A display unit 208 comprises a display device such as a CRT, LCD, or the like, and an OS or application program and displays the operation result of a process by means of a GUI. An input/output unit 209 is used to exchange data with an external device such as a position/direction sensor or the like (to be described later). The external storage device 205, keyboard 206, mouse 207, display unit 208, and input/output unit 209 are connected to the bus 203 via an interface 204.

Figure 3:
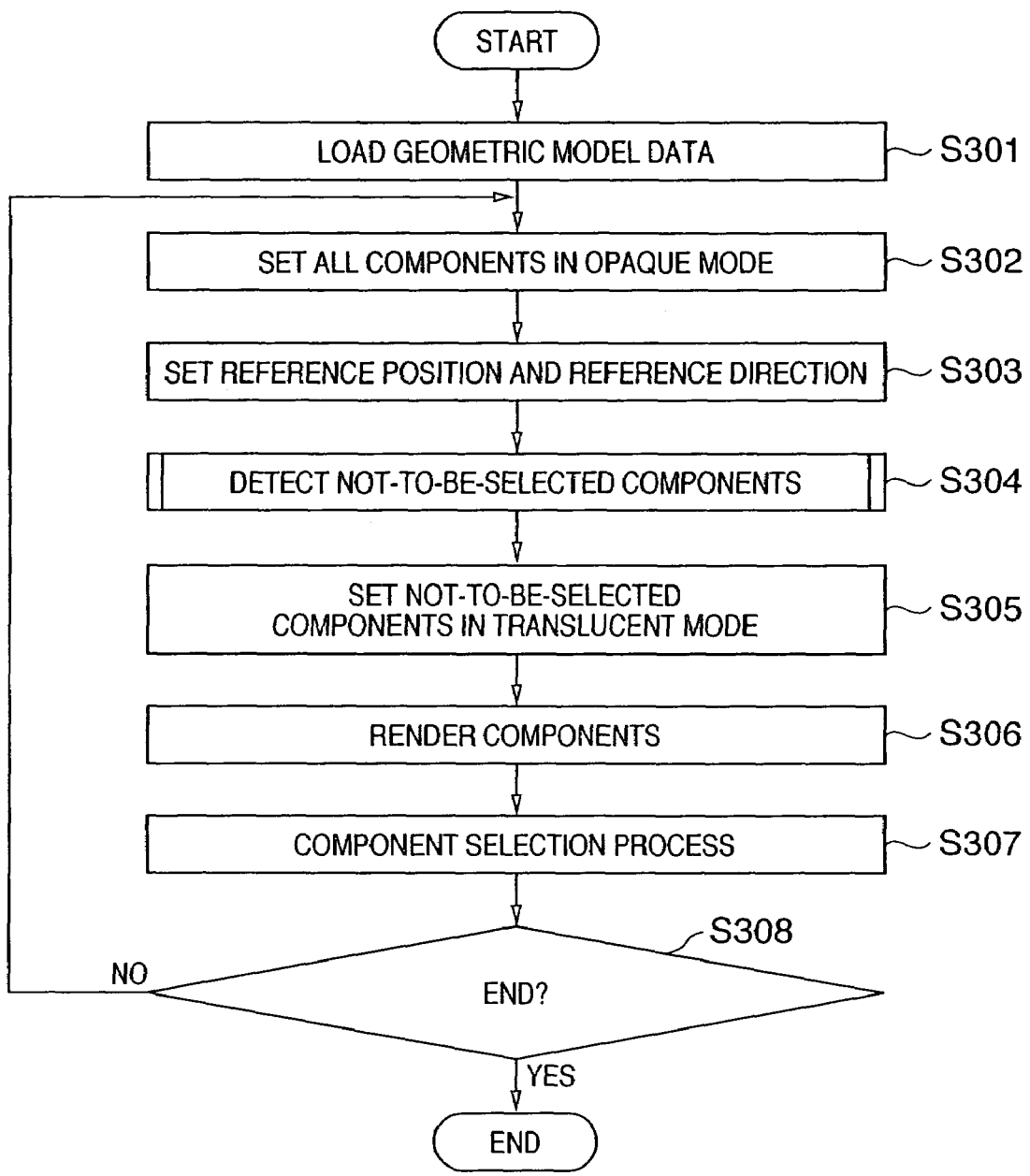
FIG. 3 is a flowchart for explaining the overall component selection process in the first embodiment.

FIG. 3 is a flowchart showing the flow of the overall processing in the information processing apparatus of this embodiment.

When the processing starts, the CPU 201 loads data indicating attributes such as the structure, color, and the like of a 3D geometric model from the external storage device 205 in step S301, and resets rendering modes of all components to an opaque mode in step S302.

In step S303, the CPU 201 sets a reference position and direction. In this embodiment, the measured values output from a 3D position/direction sensor connected to the input/output unit 209 are loaded, the measured value of a position is set as the reference position, and that of the direction is set as the reference direction. As an example of a product that can be used as such 3D position/direction sensor, "Fastrak" as a 3D position/direction sensor available from Polhemus Inc. (USA) is known. A pointer obtained by attaching or incorporating such sensor to or in a support member that can be operated by the user is connected to the input/output unit 209, and is used to input measured values under the control of the CPU 201.

Figure 10:
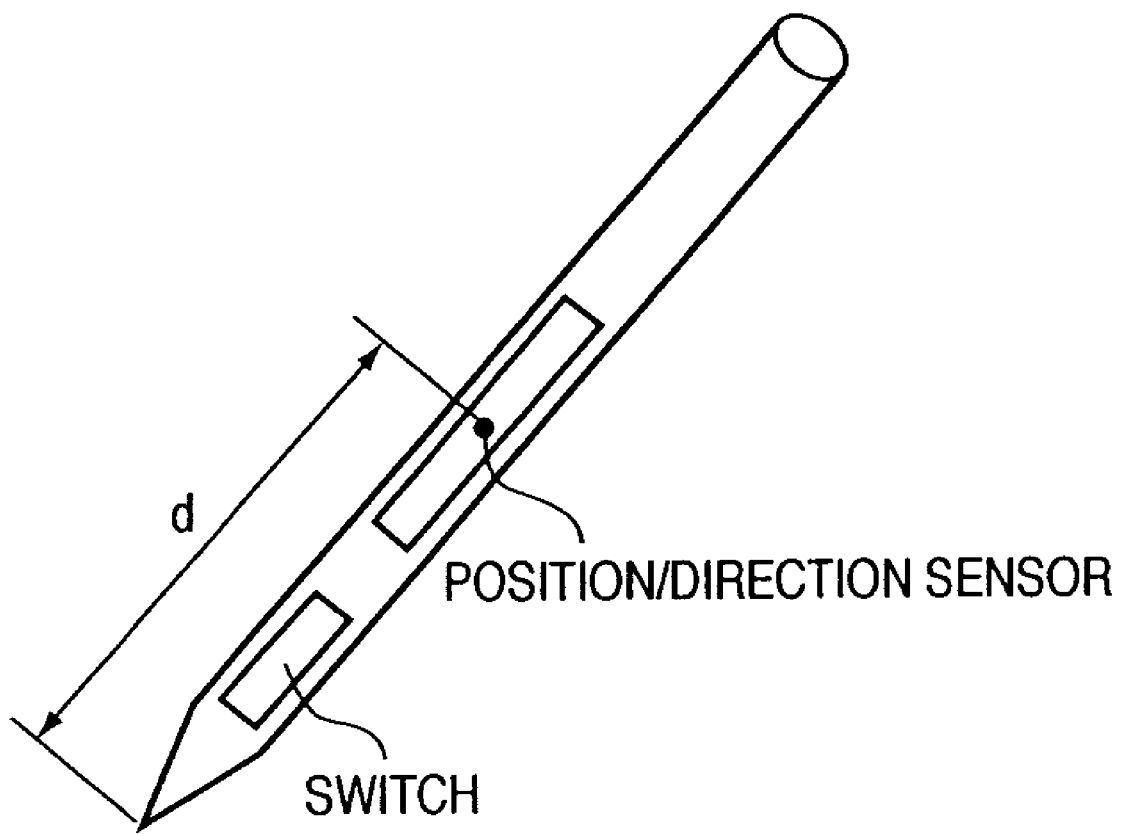
FIG. 10 shows an example of a stylus having a 3D position/direction sensor.

FIG. 10 shows a stylus as an example of the input device comprising the 3D position/direction sensor. The stylus has, e.g., a pen shape, and incorporates a 3D position/direction sensor. The stylus tip position can be estimated based on the position and direction detected by the position/direction sensor, and a distance d from the stylus tip, and can be used as the reference position. Alternatively, the output coordinate value of the 3D position/direction sensor may be used as the reference position, and the distance d may be used as the reference distance.

Note that correspondence between the 3D position and direction of the stylus which is manipulated by the user on the physical space and those on the space where the 3D geometric model is defined can be specified in advance. Therefore, the CPU 201 can transform the measured values of the 3D position/direction sensor obtained by the input/output unit 209 into position/direction values on the space where the 3D geometric model is defined, on the basis of predetermined transformation formulas. Then, the CPU 201 can render the current reference position and direction on the display unit 208 together with the 3D geometric model to be processed. Note that this embodiment uses, as the reference distance, a constant value which is determined in advance for the system.

In step S304, the CPU 201 detects not-to-be-selected components. Details of this process will be explained later. In step S305, the CPU 201 sets the rendering mode of the not-to-be-selected components detected in step S304 to be translucent. The flow then advances to step S306 to render CG images of respective components and display these images on the display unit 208. As a result of the rendering mode setting process in steps S302 and S305, to-be-selected components are rendered opaque, and not-to-be-selected components are rendered translucent.

In step S307, the CPU 201 executes component selection. More specifically, the CPU 201 detects to-be-selected components, which meet predetermined conditions (more particularly, a component which intersects a line segment first, a component closest to the reference position, etc.), of those which intersect the line segment extending from the reference position in the reference direction. The CPU then records detection result data in the external storage device 205 as a file, displays the data on the screen of the display unit 208, and/or outputs the data onto a network (not shown). Note that the component selection process in step S307 may be executed only when some condition is met (e.g., upon detection of depression of a switch of the stylus is detected, depression of a predetermined key assigned to execution of the component selection process of those of the keyboard 206, or the like).

Finally, the CPU 201 checks in step S308 if an end instruction of the overall processing is input via the keyboard 206 or mouse 207. If no end instruction is input, the flow returns to step S302 to continue the processing. Otherwise, the processing ends.

Figure 11:
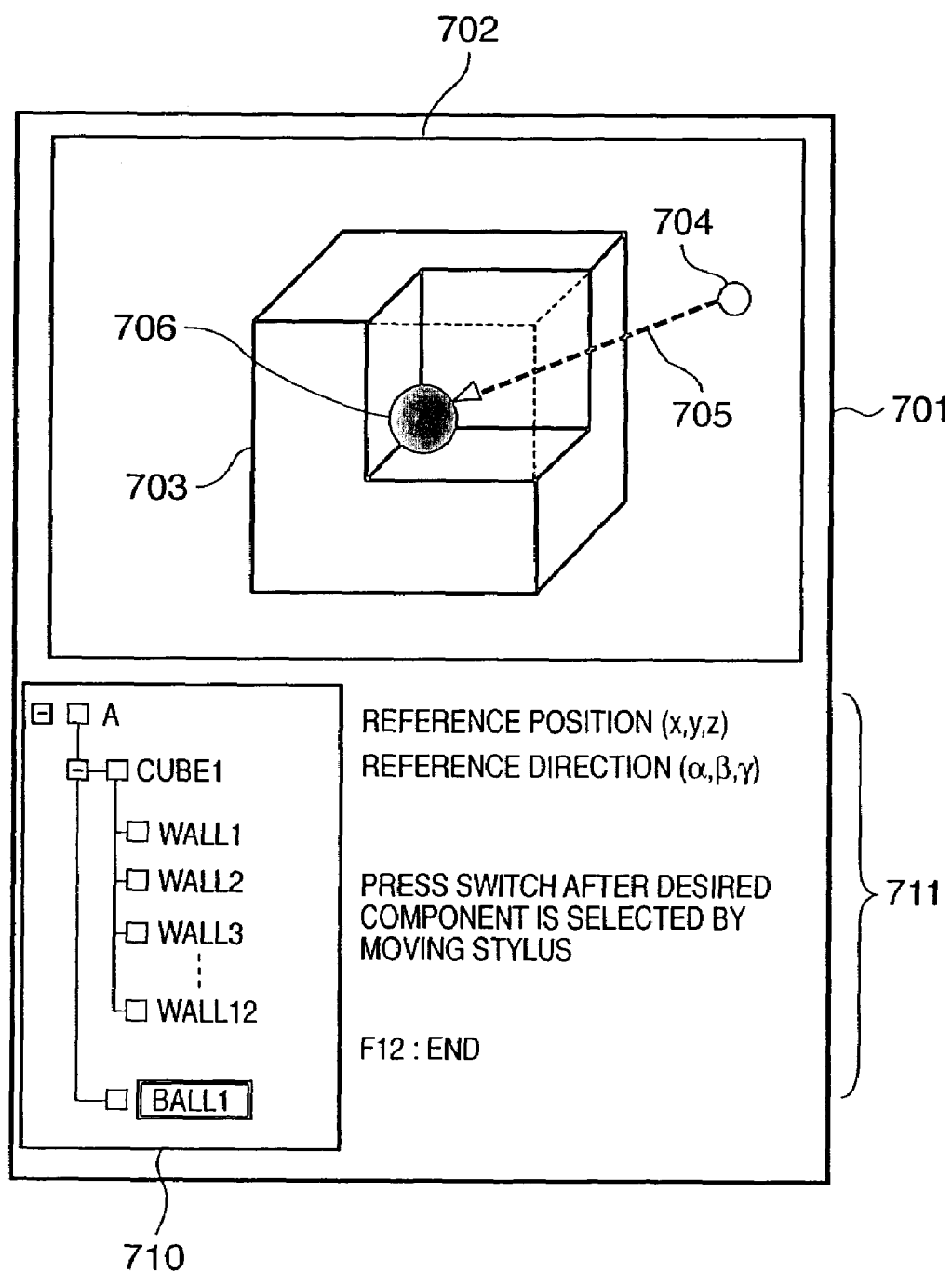
FIG. 11 shows an example of a GUI window in the first embodiment.

FIG. 11 shows an example of a GUI window displayed on the display unit 208 via the processing shown in FIG. 3.

Referring to FIG. 11, a window 701 includes three areas, i.e., a 3D geometric model display area 702, model information display area 710, and reference position/direction display area 711. The 3D geometric model display area 702 displays a geometric model 703. A reference position 704 and reference direction 705 according to the input from the 3D position/direction sensor, and the reference distance are displayed on the 3D geometric model display area 702 to allow the user to make interactive component selection. Reference numeral 706 denotes one of components of a geometric model, which can be visually recognized via not-to-be-selected components determined based on the reference position and direction, and is currently set in a selected state.

The model information display area 710 hierarchically displays the names of components which form the displayed 3D geometric model, and their depth ordering. Before each component name, an icon indicating if the component is currently displayed in a translucent or opaque mode, and a component in a selected state is highlighted. Note that the display method shown in FIG. 11 is merely an example. The model information display area 710 and reference position/direction display area 711 may be displayed using other displayed methods, or they may be omitted. The reference position/direction display area 711 displays the virtual (transformed) coordinate values of the reference position 704 and the reference direction 705 displayed on the 3D geometric model display area 702.

The user observes changes of the display contents of the 3D geometric model display area 702 (e.g., those shown in FIGS. 1A to 1C) while manually manipulating the stylus shown in, e.g., FIG. 10. When a desired component becomes selectable, the user can select an arbitrary component which forms the 3D geometric model by, e.g., pressing the switch of the stylus or the predetermined key on the keyboard 206.

The selection result can be passed to another application and can undergo processes such as rotation of a component and the like. Of course, a program that implements the process shown in FIG. 3 may be built in as a component selection module in a 3D geometric model edit application.

Figure 4:
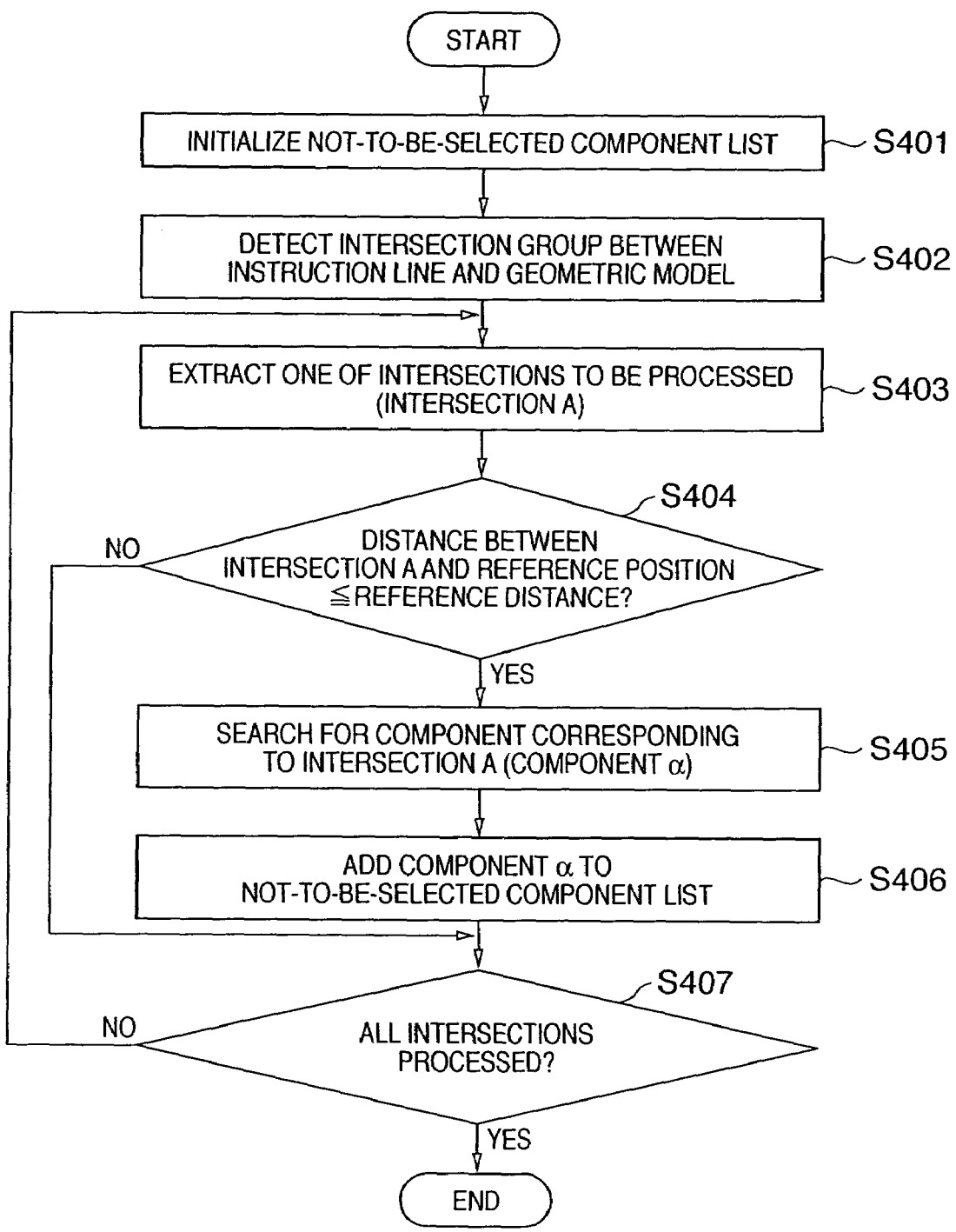
FIG. 4 is a flowchart for explaining details of a not-to-be-selected component detection process in FIG. 3.

The detection process of not-to-be-selected components in step S304 will be described below using the flowchart of FIG. 4. This process outputs a list of components detected as not-to-be-selected components (to be referred to as a "not-to-be-selected component list" hereinafter) as the processing result. This list includes identification numbers, component names, and the like, which are used to identify individual components.

In step S401, the CPU 201 initializes the contents of the not-to-be-selected component list, so that no not-to-be-selected components are listed up (more specifically, the CPU 201 clears variables that store the not-to-be-selected component list or generates a new file that stores the not-to-be-selected component list).

In step S402, the CPU 201 calculates an intersection group between an instruction line (a line segment which has the reference position as an origin and extends in the reference direction) and a geometric model. This process can be implemented using the function of the aforementioned graphics library "Open Inventor". The CPU 201 then selects one intersection (intersection A) which does not undergo processes in steps S404 to S406 from the intersection group detected in step S402 (step S403). In step S404, the CPU 201 compares the distance between intersection A and the reference position with the reference distance. If (distance between intersection A and reference position)≦reference distance, the flow advances to step S405; otherwise, the flow jumps to step S407.

In step S405, the CPU 201 searches for component α which includes intersection A of those which form the geometric model. In step S406, the CPU 201 adds information associated with component α obtained as a result of the search process in step S405 to the not-to-be-selected component list, and the flow then advances to step S407. The CPU 201 checks in step S407 if the processes in steps S404 to S406 are applied to all the intersections obtained in step S402. If it is determined that all the intersections have been processed, the not-to-be-selected component detection process ends. On the other hand, if it is determined that intersections to be processed still remain, the flow returns to step S403.

The method which sets an occluded-component to be visually recognizable and selectable by setting a line segment on a 3D space and rendering translucent components which intersect that line segment has been explained.

In this embodiment, after all components which are not to be selected are detected, their rendering mode is set. However, the processing procedure is not limited to this as long as the process for setting the rendering mode of all not-to-be-selected components in a translucent mode is completed before the rendering process of components. For example, every time one to-be-selected component is detected, its rendering mode may be set.

Figure 5:
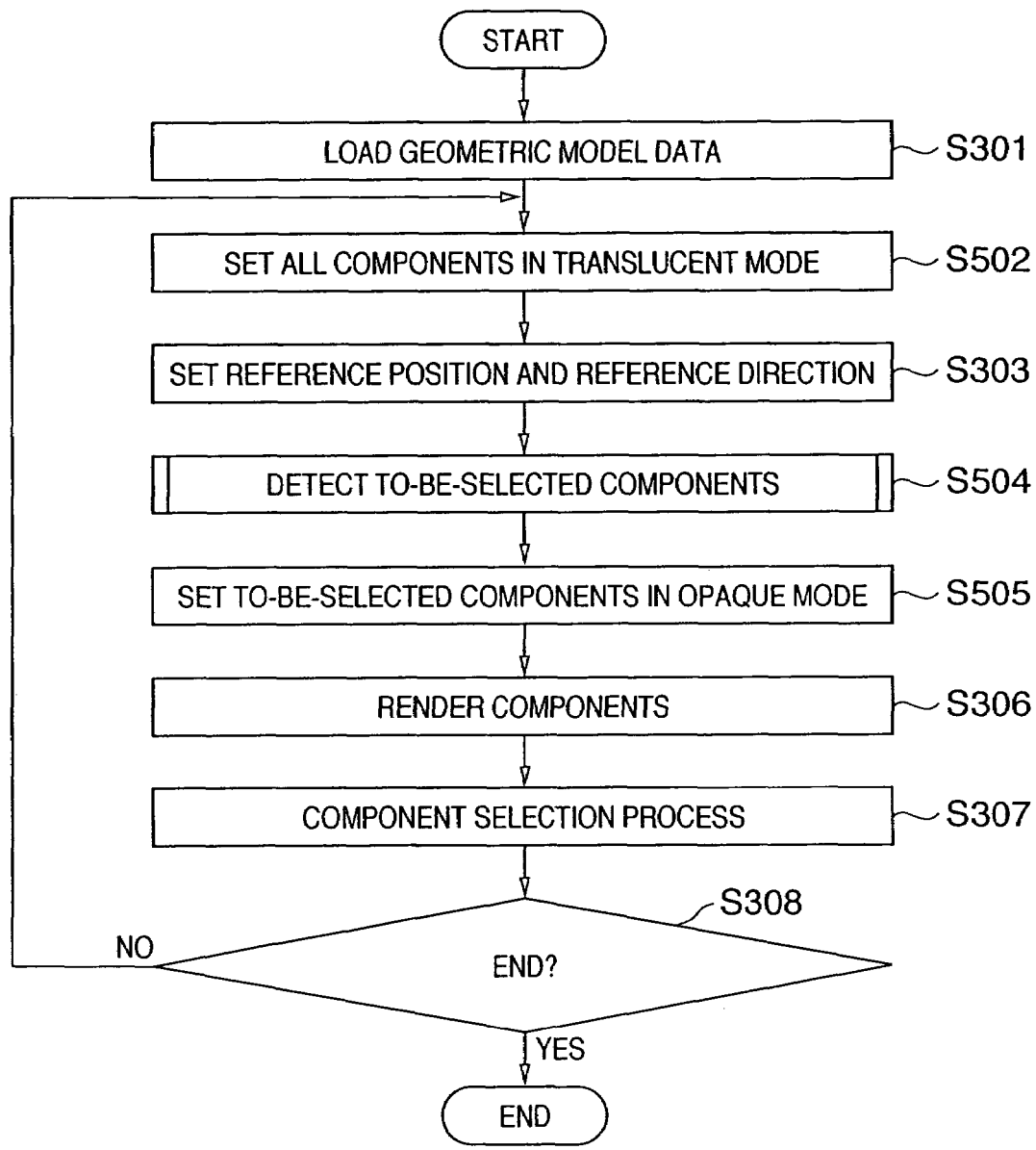
FIG. 5 is a flowchart for explaining another example of the component selection process in the first embodiment.

In this embodiment, after all components are set to be opaque, only not-to-be-selected components are set in a translucent mode. However, the present invention is not limited to such specific procedure as long as the rendering mode of not-to-be-selected components is set in a translucent mode. For example, as shown in the flowchart of FIG. 5, after all components are set in a translucent mode (step S502), to-be-selected components may be detected (step S504), and their rendering mode can be set as an opaque mode (step S505). In step S504, to-be-selected components can be detected by subtracting not-to-be-selected components obtained in step S304 in the flowchart of FIG. 1 from all the components. Since steps other than steps S502, S504, and S505 in the flowchart of FIG. 5 are common to those in FIG. 3, a description thereof will be omitted.

Second Embodiment

In the first embodiment, not-to-be-selected components are rendered by setting their rendering mode in a translucent mode. However, the rendering mode is not limited to this, and other methods may be used as long as to-be-selected components can be visually recognized through not-to-be-selected components. More specifically, not-to-be-selected components may be displayed using wireframes or may not be displayed (non-display).

Upon rendering not-to-be-selected components, one of these plurality of rendering modes may be selected. At this time, all not-to-be-selected components may be rendered in the same rendering mode throughout one rendering process, or the rendering mode may be set for respective components.

In the first embodiment, to-be-selected components are rendered opaque. However, the present invention is not limited to this, and to-be-selected components need only be visually distinguished from the not-to-be-selected components. Furthermore, upon rendering to-be-selected components, one of a plurality of rendering modes may be selected.

Figure 8:
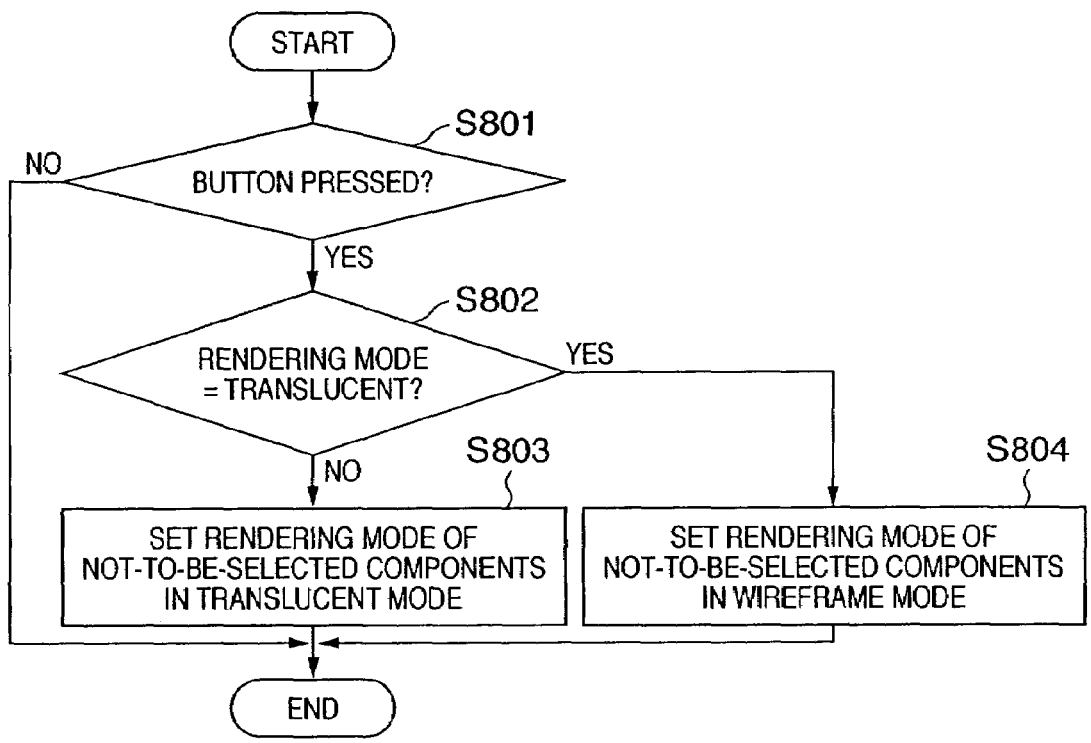
FIG. 8 is a flowchart for explaining a rendering mode switching process of a to-be-selected component in the second embodiment.

As a method of changing rendering modes, for example, depression of a predetermined key on the keyboard 206 is monitored, and upon detection of key depression, a given rendering mode may be switched to another one. FIG. 8 is a flowchart showing the flow of a process for switching the rendering mode of not-to-be-selected components between translucent and wireframe modes upon depression of the keyboard. This process can be executed in place of step S305 in FIG. 3 or 5.

It is checked in step S801 if a key which is set in advance to switch the rendering mode has been pressed. If it is determined that the key has been pressed, the flow advances to step S802; otherwise, the process ends. It is checked in step S802 if the rendering mode which is currently set as that for not-to-be-selected components is a translucent mode. If the setting indicates the translucent mode, the flow advances to step S804 to set the rendering mode of not-to-be-selected components in a wireframe mode, thus ending the process. On the other hand, if it is determined in step S802 that the translucent mode is not selected, the rendering mode of not-to-be-selected components is set in a translucent mode in step S803, thus ending the process.

According to this embodiment as well, the same effects as in the first embodiment can be obtained.

Third Embodiment

In the first embodiment, all components which are not not-to-be-selected components are displayed opaque as to-be-selected components. By contrast, only specific components which are actually selected in the component selection process in step S307 may undergo a rendering process as to-be-selected components.

Figure 6:
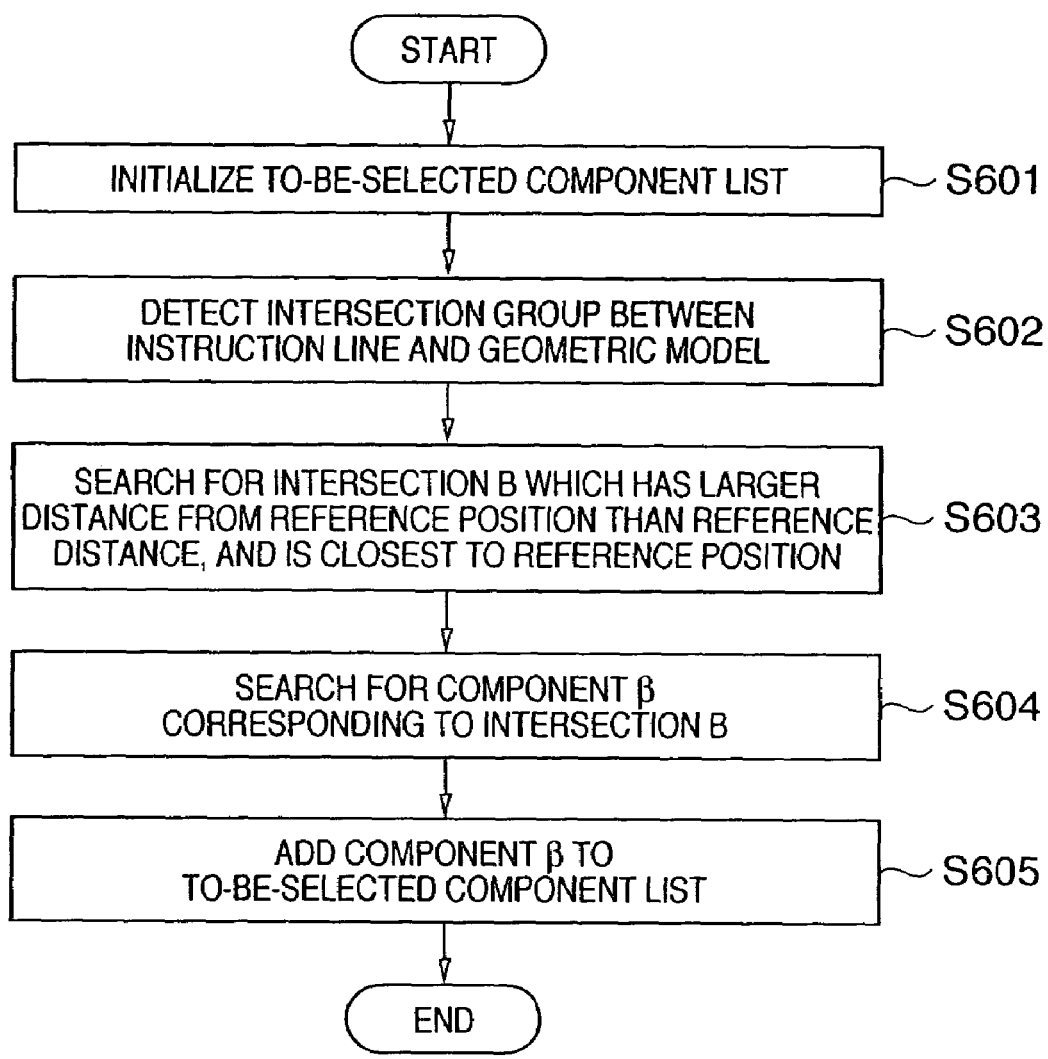
FIG. 6 is a flowchart for explaining details of a to-be-selected component detection process in the third embodiment.

The flow of the overall processing in this embodiment is substantially the same as that shown in FIG. 3 or 5, except for only the process in step S304 or S504. FIG. 6 is a flowchart showing details of the to-be-selected component detection process according to this embodiment. The process according to this flowchart is executed in place of the process in step S304 in FIG. 3 or step S504 in FIG. 5.

When the to-be-selected component detection process starts, the CPU 201 initializes a list that lists up to-be-selected components (step S601). As in step S402 (FIG. 4), the CPU 201 detects an intersection group between the instruction line and 3D geometric model (step S602). After that, the CPU 201 calculates intersection B included in a to-be-selected component of the intersection group detected in step S602 (step S603). In this embodiment, an intersection which has a distance from the reference position larger than the reference distance, and is closest to the reference position is selected as intersection B (step S603).

In step S604, the CPU 201 searches for component β corresponding to intersection B. The CPU 201 adds the component obtained in step S604 to the to-be-selected component list (step S605).

In this embodiment as well, the rendering mode of to-be-selected components need not be an opaque mode, or one of a plurality of rendering modes may be selected, as described in the second embodiment.

According to this embodiment, since only specific components of those which are not not-to-be-selected components are handled as to-be-selected components, they can be clearly identified from other components. When other components are rendered translucent, since the number of translucent components increases, visually recognizable ones of to-be-selected components increase. As a result of these effects, component selection is more facilitated.

Fourth Embodiment

In the first and second embodiments, all to-be-selected components have the same rendering mode. By contrast, components to be selected in the component selection process in step S307 (those which meet predetermined conditions of to-be-selected components) may be set to have a rendering mode different from that of other to-be-selected components. For example, the following rendering modes can be set: the component surface is displayed in red; a component is flickered; a bounding box (a minimum rectangle or rectangular parallelepiped which includes a component) of the component is displayed to be superposed on the component itself; and a wireframe of a component is displayed to be superposed on the component itself. In addition, various other rendering modes (display methods) can be adopted.

According to this embodiment, a specific one to be actually selected of to-be-selected components can be more apparently identified from other to-be-selected components, thus consequently facilitating component selection.

Fifth Embodiment

In the above embodiments, components that intersect a line segment, which is parallel to the reference direction and has a length as the reference distance having the reference position as an origin, are determined as not-to-be-selected components. However, not-to-be-selected components may be determined based on other geometrical search criteria.

For example, components which satisfy the following geometrical search criteria can be selected as not-to-be-selected components:

(1) a component which is included in a three-dimensional (3D) shape (a rectangular parallelepiped, sphere, or the like) of a predetermined size having the reference position as the center;

(2) a component whose bounding box is included in a 3D shape of a predetermined size having the reference position as the center;

(3) a component whose origin that specifies a component coordinate system is included in a 3D shape of a predetermined size having the reference position as the center; and (4) a component whose barycenter is present within a 3D shape of a predetermined size having the reference position as the center.

Also, the center of the 3D shape in (1) to (4) may be changed to another position. For example, the center of the 3D shape can be set as an intersection which is closest to the reference position of an intersection group between the 3D geometric model and line segment which has the reference position as an origin and extends in the reference direction.

Figure 9:
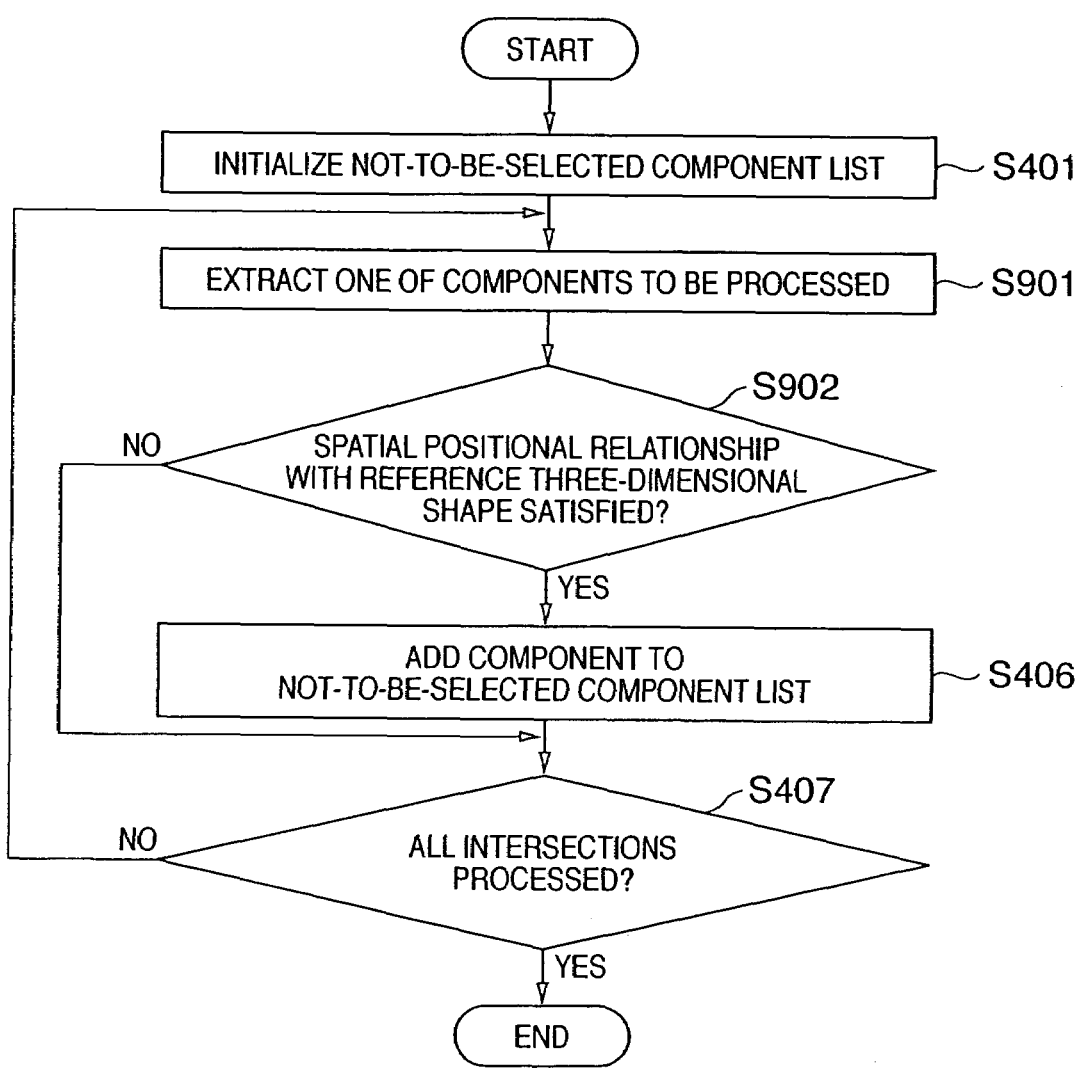
FIG. 9 is a flowchart for explaining details of a not-to-be-selected component detection process in the fifth embodiment.

The not-to-be-selected component detection process executed when the conditions based on the three-dimensional positional relationships exemplified above are used will be described below using the flowchart of FIG. 9. In FIG. 9, the same reference step numbers denote steps that execute the same processes as those in FIG. 4.

The CPU 201 initializes the not-to-be-selected component list (step S401), and extracts one component to be processed from those which form the 3D geometric model (step S901). The CPU 201 then checks if the extracted component satisfies the aforementioned geometrical search criteria, which are specified on the basis of the spatial positional relationship with the 3D shape (reference 3D shape) (step S902). The CPU 201 adds the component which satisfies the criteria to the not-to-be-selected component list (step S406). After the aforementioned process is applied to all components, the process ends.

Of course, a condition for detecting and determining a not-to-be-selected component can be selected from a plurality of conditions. As a result, not-to-be-selected components can be efficiently detected depending on the shape of the 3D geometric model and the like, resulting in easy component selection.

Sixth Embodiment

In the above embodiments, the reference position and direction are determined using the 3D position/direction sensor. However, the setting method of the reference position and direction is not limited to such specific method.

For example, the position and direction of a virtual camera, which is set to render a 3D geometric model, can be used as the reference position and direction.

Figure 7:
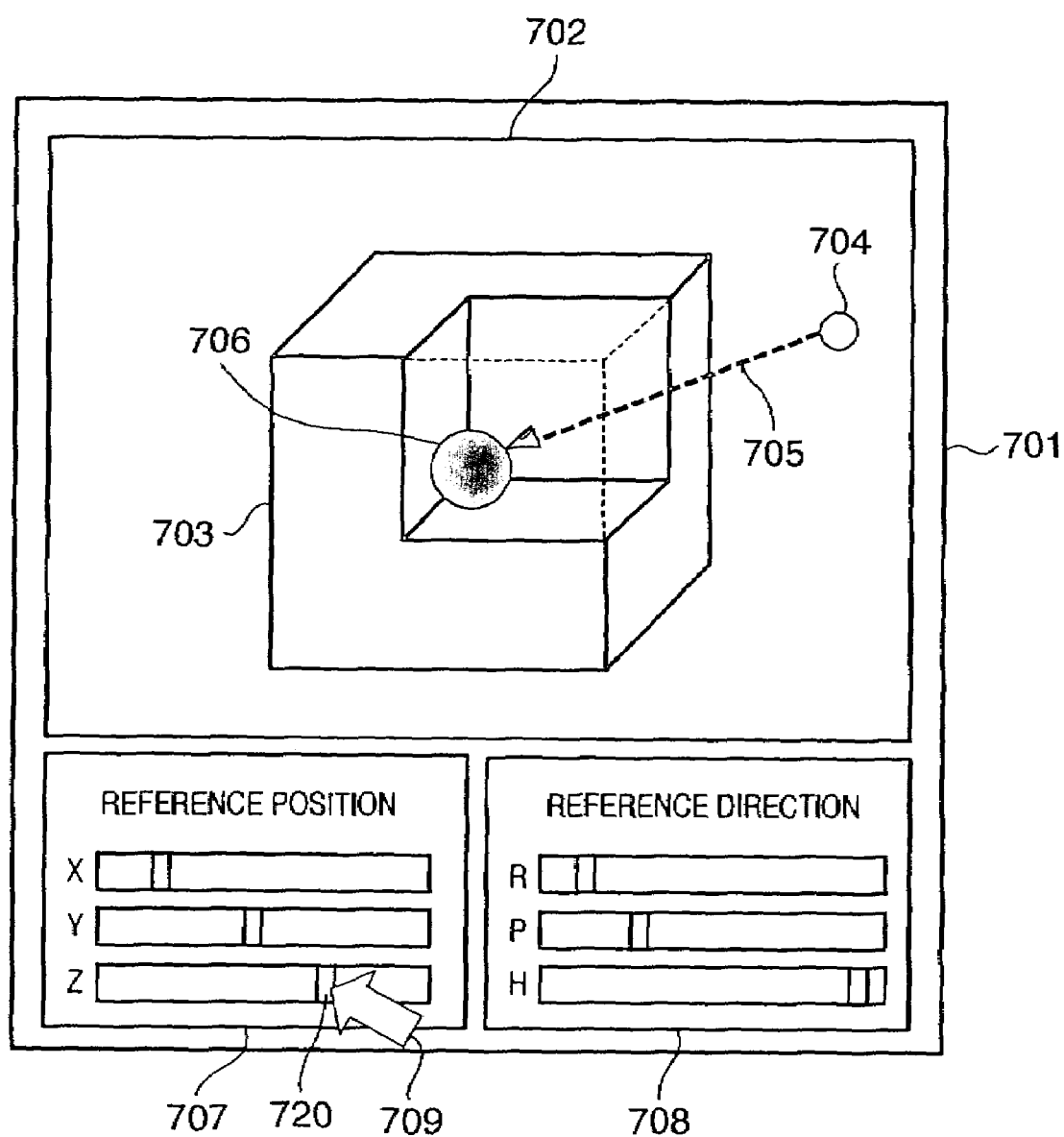
FIG. 7 shows an example of a GUI window used to set the reference position and direction in the sixth embodiment.

Alternatively, the reference position and direction may be set using a GUI (graphical user interface). FIG. 7 shows a display example of such GUI.

Referring to FIG. 7, a window 701 as a whole includes three areas, i.e., a 3D geometric model display area 702, reference position setting area 707, and reference direction setting area 708. Note that reference numerals 704 and 705 denote a virtual reference position and direction; and 706, one of components of the geometric model, which can be visually recognized via not-to-be-selected components determined by the reference position and direction.

The reference position setting area 707 includes sliders which correspond to respective coordinate axes on a virtual 3D space which is specified to render the 3D geometric model. When the user drags a handle 720 of a desired slider to the right or left using a mouse cursor 709 by operating the mouse 207, the position of the handle 720 changes, and the coordinate value of the reference position changes to a value corresponding to the position of the handle 720. The reference direction setting area 708 includes sliders corresponding to three Euler angle elements. These sliders can also be manipulated by the mouse as in the reference position setting area 707.

The slider positions on the reference position setting area and reference direction setting area are loaded by the reference position/direction setting process (step S303), and the reference position and direction are set based on these slider positions. Therefore, when the user manipulates the sliders, the display states of the reference position 704 and reference direction 705, and that of the 3D geometric model on the 3D geometric model display area 702 are updated. For this reason, the user can select a desired component while observing the display states on the 3D geometric model display area 702.

Seventh Embodiment

In the above embodiments, the reference position and direction which are set to determine not-to-be-selected components are also used for the purpose of selecting components. However, a position and direction on the 3D space for component selection can be set independently of the reference position and direction used to determine not-to-be-selected components. In this case, the component selection process in step S307 is executed on the basis of the reference position, direction, and distance set for component selection.

In this way, since a plurality of reference directions are allowed to be set, more efficient component selection can be made according to the positional relationship between the occluding- and occluded-components.

Furthermore, other arbitrary component selection methods can be used in place of the method of selecting components by setting the position and direction on the 3D space. For example, the following method may be used. That is, a position on the 3D space is set using the stylus or the like, and a component which has a smallest distance from that point to the origin of a component coordinate system is selected.

Eighth Embodiment

The above embodiments have exemplified only a case wherein the reference distance or the size of the 3D shape (reference 3D shape) is constant for the sake of simplicity. However, the sizes of these reference ranges can be dynamically changed.

In this case, a slider or dial used to set the reference distance or the size of the reference 3D shape is added to the GUI shown in, e.g., FIG. 7 or 11, and the user can change them by manipulating the mouse or the like in the same manner as the reference position and direction.

Of course, adjustment may be made using an input device connected to the input/output unit 209, e.g., a stylus (with an adjustment dial), joystick, or the like.

Such reference distance setting process is executed in step S303 in FIG. 3. The reference distance may be inhibited from being changed in the not-to-be-selected component detection process (step S304), or it may be permitted to be dynamically changed in the not-to-be-selected component detection process. In the latter case, when the reference distance is changed, the not-to-be-selected component detection process can be redone.

Since the reference range can be changed, the efficiency when an occluded-component is to be selected by changing only the depth direction while the reference position and direction remain the same can be improved.

Ninth Embodiment

In the above embodiments, the reference position, direction, and distance are displayed on the 3D geometric model display area 702, but they may be non-displayed. A reference 3D shape exemplified in the fifth embodiment may be displayed in a wireframe mode or the like, so as not to disturb display of the 3D geometric model to be seen. Of course, display/non-display of such shape indicating the not-to-be-selected component detection condition may be switched by a predetermined key input or the like.

Note that the present invention includes a case wherein equivalent functions are achieved by supplying a program of software that implements the functions of the aforementioned embodiments to a system or apparatus directly or via wired/wireless communications, and executing the supplied program by a computer of that system or apparatus.

Therefore, the program code itself supplied to and installed in a computer to implement the functional process of the present invention using the computer implements the present invention. That is, the scope of the claims of the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, magnetic recording media such as a flexible disk, hard disk, magnetic tape, and the like, optical/magnetooptical recording media such as an MO, CD-ROM, CD-R, CD-RW, DVD-ROM, DVD-R, DVD-RW, and the like, a nonvolatile semiconductor memory, and so forth may be used.

As a program supply method using wired/wireless communications, a method of storing, in a server on a computer network, a data file (program data file) which can be a computer program that forms the present invention on a client computer, such as a computer program itself that forms the present invention, a compressed file including an automatic installation function, or the like, and downloading the program data file to the client computer that has established connection may be used. In this case, the program data file may be divided into a plurality of segment files, which may be allocated on different servers.

That is, the present invention also includes a server that makes a plurality of users download the program file for implementing the functional processes of the present invention on their computers.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-217772 filed on Jul. 26, 2004, which is hereby incorporated by reference herein.

What is claimed is:

1. An information processing method comprising:
   a determining step of determining, in response to a value input via an input device, a reference position, reference direction, and reference distance in a virtual three-dimensional space as geometric criteria;
   a detection step of detecting a component, which has an intersection with a line that extends from the reference position in the reference direction, and has a length of the reference distance, of a plurality of components which form a three-dimensional geometric model of which a display mode is set to an opaque mode;
   a changing step of changing a display mode of the component, detected in said detection step, of the plurality of components to be one of a translucent mode and a wireframe mode;
   a three-dimensional model displaying step of displaying the three-dimensional geometric model on the basis of the display mode set for each of the plurality of components and displaying the rendered three-dimensional geometric model; and
   a selected state setting step of setting one component, which satisfies a predetermined condition, from among the components rendered in the opaque mode, in a selected state,
   wherein the reference distance dynamically varies as the value input via the input device changes.

2. The method according to claim 1, wherein the selected state setting step includes a step of setting, in the selected state, a component, which has a shortest distance from the reference position, of components which have intersections with a line segment that extends from the reference position in the reference direction and have a distance from the reference position larger than the reference distance.

3. The method according to claim 1, wherein the selected state setting step includes a step of using a second reference position, second reference direction, and second reference distance different from the reference position, reference direction, and reference distance which are determined in said determining step as the geometric criteria, and setting, in the selected state, a component, which has an intersection with a line segment that extends from the second reference position in the second reference direction and has a shortest distance from the second reference position, from among the components which do not satisfy the geometric criteria.

4. The method according to claim 1, wherein the three-dimensional model rendering step includes a step of rendering a shape that represents the geometric criteria together with the three-dimensional geometric model.

5. The method according to claim 1, wherein the input device is a three-dimensional position/direction sensor attached to a member manipulated by a user.

6. The method according to claim 1, further comprising:
a display step of displaying a GUI that prompts a user to set a value required to determine the geometric criteria, and
wherein the input device inputs the value used in said determining step via the GUI.

7. A computer-readable recording medium storing a program for making a computer execute an information processing method of claim 1.

8. An information processing method comprising:
a determining step of determining, in response to a value input via an input device, a reference position, reference direction, and reference distance in a virtual three-dimensional space as geometric criteria;
a detection step of detecting a component, which has an intersection with a line that extends from the reference position in the reference direction, and has a length of the reference distance, of a plurality of components which form a three-dimensional geometric model of which a display mode is set to an opaque mode;
a changing step of changing a display mode of the component, detected in said detection step, of the plurality of components to be one of a translucent mode and a wireframe mode; and
a three-dimensional model displaying step of displaying the three-dimensional geometric model on the basis of the display mode set for each of the plurality of components and displaying the rendered three-dimensional geometric model,
wherein the reference distance dynamically varies as the value input via the input device changes.

9. An information processing method of applying a display process to a plurality of components which form a three-dimensional shape model of which a display mode is set to an opaque mode, said method comprising:
a setting step of setting a reference position and reference direction, and defining a line segment extending from the reference position in the reference direction in a three dimensional space;
a search step of searching for intersections between the line segment and the plurality of components;
a comparison step of comparing distances from the reference position to the obtained intersections with a reference distance which is set in advance; and
a three-dimensional model display step of displaying components, which have distances from the reference position to the intersections smaller than the reference distance, by changing their display modes to one of a translucent mode and a wireframe mode.

10. An information processing apparatus comprising:
determining means for determining, in response to a value input via an input device, a reference position, reference direction, and reference distance in a virtual three-dimensional space as geometric criteria;
detection means for detecting a component, which has an intersection with a line that extends from the reference position in the reference direction, and has a length of the reference distance, of a plurality of components which form a three-dimensional geometric model of which a display mode is set to an opaque mode;
changing means for changing a display mode of the component, which detected by said detection means, of the plurality of components to be one of a translucent mode and a wireframe mode;
three-dimensional model displaying means for displaying the three-dimensional geometric model on the basis of the display mode set for each of the plurality of components and displaying the rendered three-dimensional geometric model; and
selected state setting means for setting one component, which satisfies a predetermined condition, from among the components rendered in the opaque mode, in a selected state,
wherein the reference distance dynamically varies as the value input via the input device changes.

* * * * *

UNITED STATES PATENT AND TRADEMARK OFFICE
CERTIFICATE OF CORRECTION

PATENT NO.        : 7,420,556 B2                                   Page 1 of 1
APPLICATION NO.   : 11/187980
DATED             : September 2, 2008
INVENTOR(S)       : Masakazu Fujiki It is certified that error appears in the above-identified patent and that said Letters Patent is hereby corrected as shown below:

COLUMN 14:

Line 29, "which" should be deleted.

Signed and Sealed this

Ninth Day of June, 2009

JOHN DOLL
*Acting Director of the United States Patent and Trademark Office*